(No Model.)
J. HARGREAVES & T. BIRD.
COMBINED DIAPHRAGM AND ELECTRODE.
No. 548,162. Patented Oct. 15, 1895.
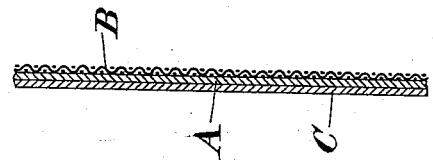
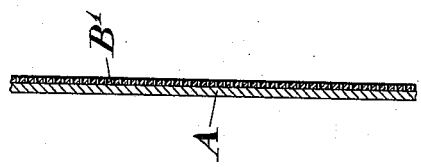
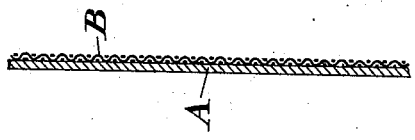
Witnesses.
Luke Hargreaves.
Walter Tate.
Inventors.
James Hargreaves.
Thomas Bird.

UNITED STATES PATENT OFFICE.

JAMES HARGREAVES, OF FARNWORTH-IN-WIDNES, AND THOMAS BIRD, OF CRESSINGTON, NEAR LIVERPOOL, ENGLAND.

COMBINED DIAPHRAGM AND ELECTRODE.

SPECIFICATION forming part of Letters Patent No. 548,162, dated October 15, 1895.

Application filed December 31, 1894. Serial No. 533,410. (No specimens.) Patented in England October 10, 1892, No. 18,039; in Belgium October 7, 1893, No. 106,662; in France October 9, 1893, No. 233,292, and in Canada November 11, 1893, No. 44,677.

*To all whom it may concern:*

Be it known that we, JAMES HARGREAVES, chemical engineer, of Farnworth-in-Widnes, and THOMAS BIRD, electrical engineer, of Cressington, near Liverpool, in the county of Lancaster, England, subjects of the Queen of Great Britain and Ireland, have invented a new and useful Combined Diaphragm and Electrode for Use in Electrolytic Apparatus, (in respect whereof we have obtained a patent in Great Britain, No. 18,039, dated October 10, 1892; in Belgium, No. 106,662, dated October 7, 1893; in France, No. 233,292, dated October 9, 1893, and in Canada, No. 44,677, dated November 11, 1893,) of which the following is a specification.

This invention relates to a combined diaphragm and electrode for use in electrolytic apparatus, its object being to enable a complete separation of the electrolytic products to be effected both from one another and from the electrolyte and thus to increase the purity of the products.

In the accompanying diagrams, Figure 1 is a longitudinal section of a combined diaphragm and electrode constructed according to our invention. Fig. 2 shows a modified form of construction. Fig. 3 illustrates another modification.

The combined diaphragm and electrode A B is made of asbestos A or other suitable fiber, deposited while plastic or in the form of pulp on wire-gauze B or on a perforated sheet-metal plate B'. The fibrous material A, which acts as a porous diaphragm, being deposited while plastic or in the form of pulp, consequently adheres to the wire-gauze B or perforated metal B', which serves as a permeable electrode. On the fibrous material there may be deposited a layer C, Fig. 3, of a porous stone-like substance, such as Portland cement, plaster-of-paris, or a mixture of clay and silicate of soda.

A diaphragm made of pulp composed of fibrous material requires the addition of a binding agent, which may consist of an insoluble silicate produced by mixing a substance—such as lime, baryta, or other alkaline earth—with a soluble silicate, such as silicate of soda or potash. The lime or its equivalent and the asbestos or other fibrous material are first deposited on the wire-gauze electrode and then dried, the surplus moisture being separated therefrom by gravity or otherwise. The electrode and dried pulp are then steeped in a solution of silicate of soda or potash. The lime then becomes converted into silicate of lime, which is insoluble, the soda or potash being left free. Instead of lime, magnesia, baryta, or other suitable alkaline earth may be used, the silicate of soda or potash acting on these substances to form an insoluble binding agent. The binding agent may, however, consist of an insoluble phosphate, the electrode and dried pulp being steeped in a solution of phosphate of soda, potash, or ammonia, instead of in a solution of silicate of soda or potash. The lime is thus changed into a phosphate of lime, which is insoluble, the soda, potash, or ammonia being left free. Soluble phosphate of lime or other earthy phosphate may be substituted for the lime, baryta, or other alkaline earth.

In some cases we carbonate the lime, baryta, or other alkaline earthy matter whereof the diaphragm is in part composed by first steeping the dried diaphragm in a solution of carbonate of soda or other suitable carbonate, redrying the diaphragm, and subsequently steeping it in the solution of a silicate of phosphate, the effect of this treatment being to impart greater density to the porous diaphragm and to render it less liable to split or laminate. Density may also be imparted to the diaphragm by first soaking it in a solution of lime or any of the soluble salts of lime, and after redrying soaking it in the solution of a silicate or phosphate. To increase the density, the above-described operations may be repeated. A solution of magnesia, baryta, or any suitable earthy salt may, however, be used instead of the solution of lime for the preliminary soaking.

What we claim as our invention, and desire to secure by Letters Patent, is—

1. The method of manufacturing a combined porous diaphragm and permeable electrode, consisting in depositing directly upon a metallic permeable electrode a plastic mixture of alkaline earth and fibrous material, drying the same, and then steeping the plate in a solution of such a nature as to convert the alkaline earth into an insoluble binder; substantially as described.

2. The method of manufacturing a combined porous diaphragm and permeable electrode, consisting in depositing directly upon a metallic permeable electrode a plastic mixture of alkaline earth and fibrous material, drying the same, steeping it in a solution of a carbonate, redrying it, and then steeping it in a solution of such a nature as to produce in conjunction with the alkaline earth the binding agent; substantially as described.

3. The method of manufacturing a combined porous diaphragm and permeable electrode, consisting in soaking a diaphragm in a solution composed in part of alkaline earth to increase its density, redrying the same, and then soaking it in a solution of such a nature as to produce the binding agent; substantially as described.

4. A combined porous diaphragm and permeable electrode, consisting of a perforated metal base, having directly secured to one face a mixture of fibrous material and an insoluble binding agent; substantially as described.

5. A combined porous diaphragm and permeable electrode, consisting of a permeable electrode having secured to one face a layer of fibrous material and a layer of stone-like material superposed upon said fibrous material, substantially as described.

JAMES HARGREAVES.
THOMAS BIRD.

Witnesses:
LUKE HARGREAVES,
WALTER TATE.